Figure 1:
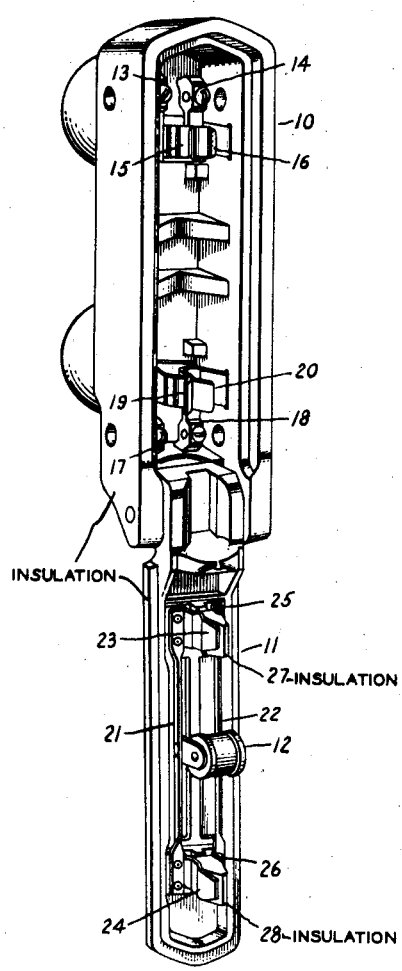

Sept. 8, 1942.  E. J. ALLEN  2,295,320

ELECTRIC DISCHARGE DEVICE

Filed June 25, 1940

Inventor:
Edwin J. Allen,
by Harry E. Dunham
His Attorney

Patented Sept. 8, 1942

2,295,320

UNITED STATES PATENT OFFICE 2,295,320

ELECTRIC DISCHARGE DEVICE

Edwin J. Allen, Pittsfield, Mass., assignor to General Electric Company, a corporation of New York Application June 25, 1940, Serial No. 342,282

2 Claims. (Cl. 200—118)

My invention relates to an electric discharge device and to a bypass protector for electrical circuits, and although not limited thereto, it has particular application as an operating device for a circuit interrupter arrangement such as may be found in a cutout.

In electrical circuits where a number of electric loops or devices are connected in series, such as obtains in street lighting applications, it has been customary to connect a short circuiting device between the loop or electric device and the source of power. The purpose of such short circuiting or bypass device is to prevent the permanent open circuiting of the remaining loops in the case of an open circuit in one of the loops. Thus, if one loop of a number of serially connected loops is open circuited, the bypass protector will immediately short circuit the incoming and outgoing lines which feed the open circuited loop so that the remaining loops will receive power from the source. However, in such applications, as constant current street lighting circuits, there is the problem of designing a bypass protector which will bypass a loop whenever there is an open circuit in the loop, but which will not short circuit the loop whenever some lightning surge or very high voltage of short duration strikes the loop which contains a bypass protector. Furthermore, when a bypass is used with a cutout, lightning protection of the insulation comprising the loop sectionalizing cutout is essential, since otherwise it is likely to be damaged by the constant current arc which persists after impulse flashover.

It is therefore an object of my invention to provide an improved electric discharge device which will differentiate between a surge of high voltage and a continuous power overvoltage.

Another object of my invention is to provide a bypass protector for electrical circuits which are connected to a constant current source which will differentiate between a sustained power frequency overvoltage and a lightning surge.

A further object of my invention is to provide an operating device for a cutout which will operate the cutout in an improved manner when a fault occurs, but which will not operate the cutout when some high voltage surge of short duration, such as caused by a lightning stroke, appears in the circuit to which the cutout is connected.

Further objects and advantages of my invention will become apparent as the following description proceeds and the features of novelty which characterize my invention will be pointed out with particularity in the claims annexed to and forming a part of this specification.

Protective devices have been used in the past, as evidenced by Patents 1,049,366—Jackson, and 1,201,646—Steinmetz, for the protection of low voltage circuits, the gap in these devices being set so that it will permanently short circuit itself when the low voltage system is "crossed" by a foreign system carrying an excessive and injurious voltage. These devices, of course, had a meltable material which would not melt if a lightning surge was impressed across the gap. Such protective devices, however, I have found are entirely unsuitable for the use to which my improved device finds such a ready application. In the first place, constant current street lighting circuits do not have available a voltage range between normal and maximum comparable with the range between the normal voltage and the foreign high voltage system which was necessary to arc over and permanently short circuit the gaps as used in the prior art. Thus the prior art devices were designed to permanently short circuit themselves only if a voltage of many times larger than normal voltage were impressed across the gap, while my improved device must operate on an overvoltage of a relatively small amount. In the second place, the loop sectionalizing cutout which may be employed with my improved protective device would arc over or fail at some point before a sufficiently large voltage as compared to normal voltage could be reached to arc over the protective device, if the prior art device were employed. Thus, I have found it to be extremely important that a device be employed which will not only distinguish between a high voltage surge of short duration and a sustained power overvoltage, but which will also arc over and permanently short circuit itself, or operate the cutout in some other manner when a fault occurs, upon the attainment of an overvoltage which is only a relatively small percentage above normal voltage. On normal voltages of the order of 2000 volts this ratio of normal voltage to device operating voltage will be of the order of two, while when the normal voltage is of the order of 300 volts, this ratio may reach a maximum value of around five.

Figure 2:
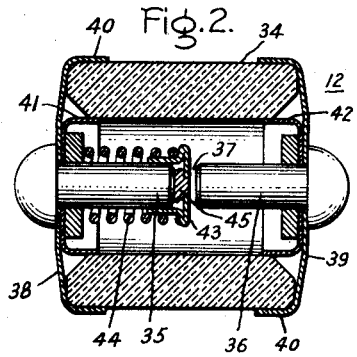
Figure 3:
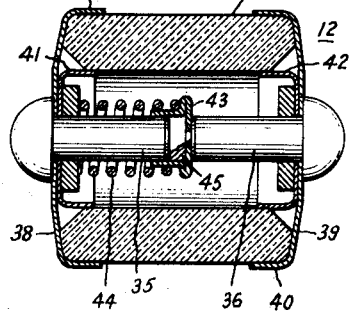

In the drawing, Fig. 1 is a perspective view of a sectionalizing cutout which is provided with an embodiment of my invention; Fig. 2 is a sectional side elevation of my improved bypass protector which may have application in the sectionalizing cutout illustrated in Fig. 1; Fig. 3 is a sectional side elevation of the bypass protector illustrated in Fig. 2, but with electrodes permanently short circuited, and Fig. 4 diagrammatically illustrates a constant current source and a plurality of serially connected loops such as may be found in street lighting circuits.

Referring to the drawing, in Fig. 1 I have illustrated a loop sectionalizing cutout such as may be used in street lighting circuits, which is provided with an embodiment of my invention. However, it is to be understood that my improved electric discharge device while having particular application as an operating device for such sectionalizing cutouts may have a variety of uses wherever it is desirable to provide an electric discharge device which needs to differentiate between a relatively high voltage surge of short duration and a sustained power overvoltage. The sectionalizing cutout illustrated in Fig. 1 includes a box or housing 10 and a hinged cover 11 in which is mounted my improved bypass protector 12. The box 10 is provided with terminals 13 and 14 which are adapted to be connected to the constant current lines. The terminals 13 and 14 are in turn connected to contacts 15 and 16 respectively. These contacts 15 and 16 are biased toward each other so that they normally connect the terminals 13 and 14 in series. The box 10 is also provided with terminals 17 and 18 which are mounted in the opposite end of the box from the terminals 13 and 14. These terminals 17 and 18 are adapted to be connected to one of the loops such as may be seen in the diagram of Fig. 4. Terminals 17 and 18 are also permanently connected to contacts 19 and 20 respectively, the contacts being biased toward each other so as to short circuit their terminals. The cover 11 is provided with two longitudinally extending bars 21 and 22. The bar 21 is provided with contacts 23 and 24 at opposite ends while the bar 22 is similarly provided with contacts 25 and 26 at its opposite ends. Insulating members 27 and 28 are provided between contacts 23 and 25 and 24 and 26 respectively. These insulating members 27 and 28 also have a portion which extends out beyond the ends of the contacts between which it is placed. It may be seen therefore that when the cover 11 is rotated 180 degrees from the position in which it is shown in Fig. 1, or to its closed position, that the two insulating members 27 and 28 will move between contacts 19 and 20 and 15 and 16 respectively. At the same time the following electrical connections take place: 24 with 15, 26 with 16, 23 with 19, and 25 with 20. Referring to Fig. 4, it may be seen that if the above described sectionalizing loop cut out is connected between one of the loops and the line that the terminals 13 and 14 will be connected in the line 29 while the terminals 17 and 18 will be connected to the loop 30 the bypass protector being connected across the terminals of the loop where it connects with the main circuit. Since the line 29 represents a portion of a street lighting circuit it will in turn be connected through the constant current transformer 31 to constant potential lines 32 and 33.

Figure 4:
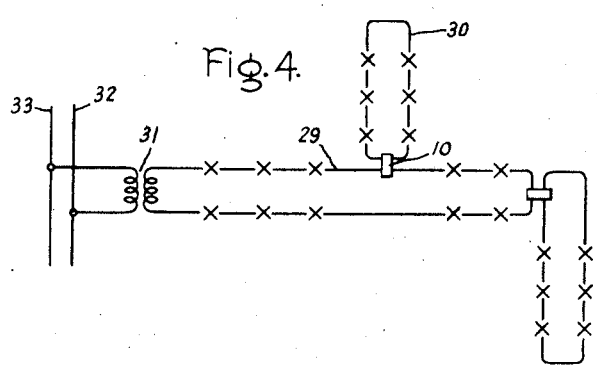

Since it is customary to connect street lighting circuits in series as may be seen from an inspection of Fig. 4, it is desirable, if some fault such as an open circuit occurs in the loop 30, to provide some arrangement which will bridge across the loop 30 so that the remaining loops may continue to be provided with power. In order to accomplish this purpose a sectionalizing cutout box, such as the type described above, is connected between the loop and the line. I, however, provide this sectionalizing cutout with my improved bypass protector or operating device 12. As may be seen in Fig. 1 the bypass protector is connected across the bars 21 and 22. In case, therefore, that an open circuit occurs in the loop 30, bypass protector 12 will function so as to short circuit the terminals 13 and 14.

In applying a short circuiting device between the loop and the line of a street lighting circuit, I have found it to be important to use a device which will not permanently short circuit the terminals 13 and 14 merely when a high voltage of short duration, such as caused by a lightning stroke, occurs. My improved device meets this criterion and in addition will operate to short circuit the line terminals in any suitable manner, such as by permanently short circuiting its gap, whenever a sustained overvoltage of approximately five times normal voltage of power frequency or less occurs. In order to accomplish this, I provide the bypass protector 12 with an insulating member 34 of any suitable material, such as porcelain, and two electrodes 35 and 36 so disposed as to define a gap 37 therebetween. In order to conveniently mount the electrodes, the insulating member 34 is formed in the shape of a cylinder and the electrodes 35 and 36 are mounted inside the cylinder by employing metal cap members 38 and 39. The members 38 and 39 are provided with overturned edges 40 which lie along the outside cylindrical surfaces of the member 34 so as to hold tightly the cap member to the insulator. The electrode 35 is then mounted on the cap member 38 while the electrode 36 is mounted on the cap member 39. Metal members 41 and 42 are provided between the electrodes 35 and 36 and the inner surface of the cylindrical member 34 so as to support rigidly the electrodes. My improved electric discharge device may have any suitable arrangement so that it will operate the cutout so as to allow the line terminals to be short circuited when a fault occurs. Thus the device may have an arrangement for short circuiting the electrodes themselves, or the device may have an arrangement operatively connected therewith to effect the desired movement of a circuit breaker arrangement, such as is disclosed in a copending application S. N. 342,259—Lincks, which is assigned to the same assignee as this present invention. In the drawing, I have illustrated my improved device with a gap short circuiting arrangement. Thus, in order to provide a short circuiting arrangement for the gap 37 a cap 43 is provided which telescopes the end of the electrode 35 and is normally biased to move toward the electrode 36 by a spring member 44. The bias spring 44 is restrained by means of a suitable connection between the cap and a relatively stationary part of the protector, the connection being arranged to function or remove its restraining force upon being overheated. This connection may therefore include a meltable metal member 45 which is placed between the member 43 and the outer end of the electrode 35. The meltable member may extend through a hole in the member 43 so that it will receive the heat from the arc which will pass between the electrode 36 and the member 43, which forms an extension of the electrode 35. Instead of employing a meltable member which will melt upon the application of heat due to arcing across the electrodes, any other arrangement which may be designed to perform the same function as the meltable member 45 may be employed. Thus, when the restraining arrangement 45 is melted by the heat of a power arc the spring member 44 will cause the short circuiting means 43 to contact the electrode 36 so that the electrodes 35 and 36 will be short circuited. Fig. 3 illustrates the electrode so short circuited, the restraining metal 45 having melted so that the gap which previously existed is effectively short circuited, and no further interelectrode arcing takes place. The desirable effect of closing the main series circuit is thus attained.

I have, therefore, found that when a bypass protector as described above is connected on a line of such a voltage, that the gap 37 may be so distanced that it will accurately arc over and permanently short circuit itself upon a relatively low sustained power overvoltage, that the gap has the further characteristics that it will arc over and reseal after a high voltage surge occurs, such as that caused by lightning which may strike either the main circuit 29 or the loop 30. From a theoretical standpoint, the minimum sparking potential of a gap in air at atmospheric pressure is approximately 300 volts. However, from a practical manufacturing standpoint the minimum gap distance which may be made to accurately and consistently arc over at a certain voltage is such that the minimum sparking potential is much higher than 300 volts. I have found that the smallest gap which can be manufactured in production of this device which will arc over at substantially the same potential each time it arcs over is in the neighborhood of about 50 mils. Such a gap will arc over quite accurately at about 1500 volts R. M. S. Of course, smaller gaps may be manufactured in production which will arc over each time at approximately the same voltage if other gases than air are used to fill the space between the gap electrodes. I may, therefore, use gaps which discharge in an atmosphere of some inert gas, such as neon or argon to obtain a smaller and accurate gap. However, when my gap has air at atmospheric pressure, the approximate minimum voltage of a loop which can be protected by my gap, such that the ratio of minimum normal voltage to spark over voltage is five, is around 300 volts. In attempting to connect a bypass protector across a line which has open circuit voltage capabilities insufficient to break down my gap, and hence fail to cause it to function, a gap which is shunted by a non-linear resistance, such as Thyrite, is desirable. Such a by-pass is described in Patent 1,971,194—McEachron et al., which is assigned to the same assignee as the present invention.

The following is a table of gap distances which, I have found, will have operating characteristics as I have described above, when employed with normal voltages as indicated:

Let us now pass to the other criterion, that is, that it will arc over and reseal, when a high voltage surge, such as lightning hits the gap. Under such a condition the by-pass protector will not permanently short circuit itself but will merely arc over when the surge discharges across the gap and then interrupt the power following current initiated by this impulse, at the next current zero without causing the member 45 to melt. Let us, therefore, consider the conditions, immediately following the arc-over, due to the lightning discharge. The lightning wave will, of course, only occur for a fraction of a cycle in time, that is, less than one-half cycle, and therefore when the power current passes through zero, the arc will have extinguished itself. It is important, however, that the arc will not restrike during the next succeeding half-cycle of power current. Since the gap has arced over on the immediately preceding half-cycle due to the lightning surge, the gasses between the gap will be ionized so that a much lower voltage will be necessary to cause the gap to arc over than that which would be necessary if the gasses in the gap were not ionized. Thus, the gap must deionize more quickly than the rate of recovery voltage so as not to arc over again. In other words the deionization rate will not be overtaken by the system recovery voltage characteristic. If, however, a particularly severe recovery voltage transient did occur, the arc in the gap might restrike and then reseal at a following current zero. I have found, therefore, contrary to the expectations of those skilled in the art, that a gap which is shunted by an insulating material instead of by some resistance material, such as one having a non-linear resistance-ampere characteristic, will have the discriminative characteristics which I desire. In other words, this gap which is sufficiently large so that it may be accurately set to arc over upon only a relatively small over-voltage, will differentiate between a high voltage surge or lightning which lasts for one-half cycle or less, and a sustained over-voltage of normal power frequency.

A protective device having the characteristics of my improved gap, has ready appliactions, among which is the street lighting field. My improved gap when so employed will protect the circuit against high voltage surges, such as lightning surges, by arcing over and resealing, and by causing the cutout to operate, such as by permanently shortcircuiting itself whenever a sustained relatively low over-voltage occurs. Thus, an over-voltage of the order of only a few times normal voltage, even when the normal voltage is a relatively low value, is sufficient to cause my improved protective device to permanently short circuit itself so as to keep the remaining series loops in normal service. Thus, I may employ

| (1) Normal voltage | | | (2) Gap setting in inches | (3) Average spark potential | | | (4) Spark potential normal voltage | | |
|---|---|---|---|---|---|---|---|---|---|
| Min. | Max. | Aver. | | Min. | Max. | Aver. | Min. | Max. | Aver. |
| 300 | 750 | 525 | 0.055 | 1,600 | 2,600 | 2,100 | 5.3 | 3.4 | 4.0 |
| 750 | 1,500 | 1,125 | 0.083 | 2,600 | 3,600 | 3,100 | 3.4 | 2.4 | 2.7 |
| 1,500 | 2,500 | 2,000 | 0.095 | 3,500 | 4,000 | 3,750 | 2.3 | 1.6 | 1.9 |

I have described above the necessary characteristics of my improved gap such that it will arc over at the proper sustained power over-voltages, with my improved by-pass or operating device a relatively inexpensive cutout box whose arc-over or failure characteristics are relatively low, Furthermore, my improved by-pass which has the desired discriminative characteristics may be used to protect a line whose maximum available voltage is of a relatively low value. Thus, a saving in power apparatus also obtains when my improved cutout is employed for the application which has been described above.

I have described my improved by-pass as a protective or operating device in a constant current street lighting circuit, because it may be efficiently applied thereto, but it is, of course, to be understood that my improved device may be employed in any other circuits that need an arrangement which has the discriminative characteristics which my improved device possesses.

Although I have shown and described a particular embodiment of my invention, I do not desire to be limited to the particular embodiment described, and I intend in the appended claims to cover all modifications which do not depart from the spirit and scope of my invention.

What I claim as new and desire to secure by Letters Patent of the United States is:

1. In combination, insulating means, electrodes mounted on said insulating means and arranged to form a gap, conducting means biased to effectively bridge said gap and electrically interconnect said electrodes, means for restraining said last-mentioned means so as normally to maintain a spark gap in the electrical circuit including said electrodes, said last-mentioned means being arranged to release said conducting means upon overheating due to arcing across said spark gap, and means for connecting said electrodes across an electrical circuit, said spark gap having a characteristic such that it will arc over upon a relatively high voltage surge of a duration less than one-half cycle of the frequency of said source and deionize at a rate so that the arc will be extinguished at the first current zero but will arc over and cause said means for restraining said conducting means to overheat and release said conducting means upon a sustained overvoltage of not more than five times normal voltage.

2. In combination, a hollow cylindrical insulating element, a conducting cap on each end of said element, a pair of electrodes, one supported by each cap and extending towards each other in said hollow cylindrical insulating element but spaced from one another to form a gap therebetween, conducting means adapted to bridge said gap under predetermined conditions, means continuously biasing said conducting means in a direction to bridge said gap, and means restraining said last-mentioned means so as normally to maintain a spark gap in the electrical circuit including said electrodes, said last-mentioned means being such as to release said conducting means for bridging said gap in response to an arc across said gap due to a sustained over-voltage but which will not release said conducting means for bridging said gap in response to a relatively high voltage surge of a duration of one-half cycle or less at normal frequency.

EDWIN J. ALLEN.